United States Patent
Cherian et al.

(10) Patent No.: US 8,990,800 B2
(45) Date of Patent: Mar. 24, 2015

(54) SYSTEM AND METHOD FOR INCREASED SYSTEM AVAILABILITY TO NETWORK STORAGE IN VIRTUALIZED ENVIRONMENTS

(75) Inventors: Jacob Cherian, Austin, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1714 days.

(21) Appl. No.: 12/353,528

(22) Filed: Jan. 14, 2009

(65) Prior Publication Data
US 2010/0180274 A1      Jul. 15, 2010

(51) Int. Cl.
*G06F 9/455*      (2006.01)

(52) U.S. Cl.
CPC .... *G06F 9/45558* (2013.01); *G06F 2009/4557* (2013.01); *G06F 2009/45579* (2013.01)
USPC .......................................................... 718/1

(58) Field of Classification Search
None
See application file for complete search history.

(56) References Cited

U.S. PATENT DOCUMENTS

| | | | |
|---|---|---|---|
| 7,865,663 B1* | 1/2011 | Nelson et al. | 711/112 |
| 2007/0174850 A1* | 7/2007 | El Zur | 719/321 |
| 2008/0244577 A1* | 10/2008 | Le et al. | 718/1 |
| 2008/0250222 A1* | 10/2008 | Gokhale et al. | 711/203 |
| 2009/0300302 A1* | 12/2009 | Vaghani | 711/162 |
| 2010/0077391 A1* | 3/2010 | Domsch et al. | 717/174 |
| 2010/0082991 A1* | 4/2010 | Baldwin et al. | 713/176 |
| 2010/0122111 A1* | 5/2010 | Allen et al. | 714/3 |

* cited by examiner

Primary Examiner — Jacob A Petranek
(74) Attorney, Agent, or Firm — Baker Botts L.L.P.

(57) ABSTRACT

A method may include a hypervisor instantiating a virtual machine including an initiator client and the hypervisor determining whether a virtualized information handling system is interfaced to an associated storage resource via an offload host bus adapter (HBA). If the virtualized information handling system is interfaced to the associated storage resource via an offload HBA, the hypervisor may execute an adapter driver for the HBA, the adapter driver for communicating input/output communications between the virtual machine and the associated storage resource via the offload HBA. If the virtualized information handling system is interfaced to the associated storage resource via another adapter other than an offload HBA, the hypervisor may execute an emulator, the emulator for emulating the functionality of the adapter driver for the HBA and for communicating input/output communications between the virtual machine and the associated storage resource via the other adapter.

12 Claims, 4 Drawing Sheets

SYSTEM AND METHOD FOR INCREASED SYSTEM AVAILABILITY TO NETWORK STORAGE IN VIRTUALIZED ENVIRONMENTS

TECHNICAL FIELD

The present disclosure relates in general to virtualized information handling systems, and more particularly to increasing system availability in virtualized information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single server can act and behave as multiple, independent servers. Server virtualization is enabled primarily by a piece of software, often called the hypervisor, that sits between the server hardware and the multiple operating systems, also called guest operating systems (guest OS). The hypervisor software provides a container that presents a logical hardware interface to the guest operating systems. An individual guest operating system, along with any applications or other software running on it, "thinks" it is running on a physical server and is known as a virtual machine.

Often, these architectures are employed for numerous reasons, e.g., (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and/or (5) encapsulation of complex configurations into a file that is easily replicated and provisioned.

Internet Small Computer System Interface (iSCSI) and other storage transports may provide many advantages when operating in a virtualized environment, primarily because of the initiator addressing model that allows an initiator address to be tied to an instance of the operating system (e.g., virtual machine) instead of a hardware device, and provides numerous multiple implementation options. For example, iSCSI may be implemented in a virtualized environment as shown in either of FIGS. 1A and 1B.

Figure 1A:
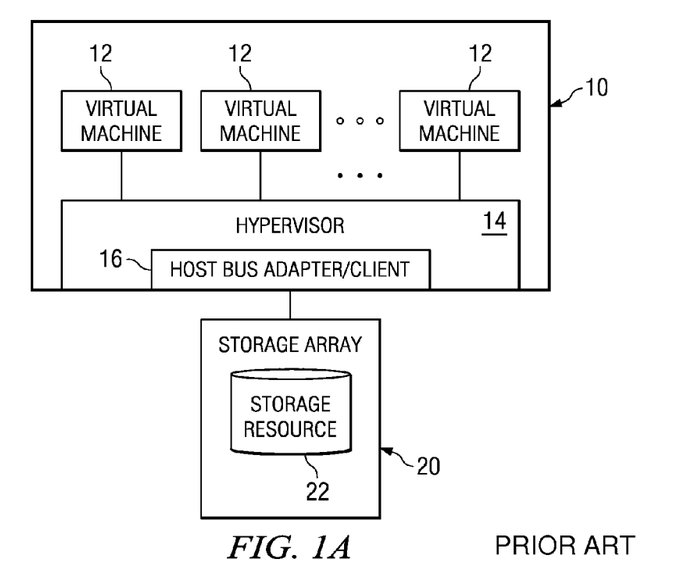
FIGS. 1A and 1B illustrate block diagrams of iSCSI implementations in virtualized environments, as is known in the art.

FIG. 1A depicts an iSCSI implementation for a virtualized environment using an iSCSI offload host bus adapter (HBA). In FIG. 1A, an information handling system 10 may have one or more virtual machines 12 instantiated thereon. Each virtual machine 12 may interface with a hypervisor 14 that manages the individual virtual machines 12. Hypervisor 14 may interface with a host bus adapter 16 or network interface card. The host bus adapter 16 may include an iSCSI client that may serve as an initiator of iSCSI commands. If a network interface card is used for iSCSI the hypervisor 14 may include an iSCSI client implemented in software that may serve as an initiator of iSCSI commands. Information handling system 10 may be communicatively coupled to a storage array 20 including one more storage resources 22. In the implementation depicted in FIG. 1A, all storage resources 22 may be mapped to iSCSI client 16 in hypervisor 14 and all storage capacity may be provisioned by hypervisor 14 to the individual virtual machines 12.

Figure 1B:
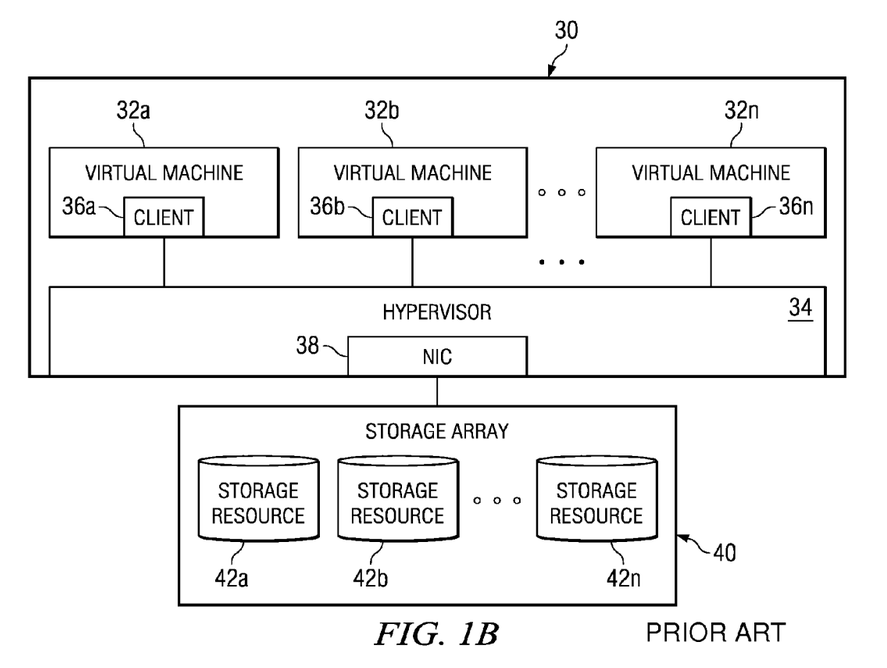

FIG. 1B illustrates a "software initiator" implementation of iSCSI in a virtualized environment (e.g., for use with a TCP offload engine or an L2 network interface card). In FIG. 1B, an information handling system 30 may have one or more virtual machines 32 instantiated thereon. Each virtual machine 32 may include its own iSCSI client 36 that may serve as an initiator of an iSCSI commands. Each virtual machine 32 may also interface with a hypervisor 34 that manages the individual virtual machines 32. Hypervisor 34 may interface with a network interface card 38 in order to communicatively couple information handling system 30 a storage array 40 including one more storage resources 42. In the implementation depicted in FIG. 1, all storage resources 42 may be mapped to individual iSCSI clients 36, and thus individual storage resources 42 may be assigned to individual virtual machines 32 (e.g., storage resource 42*a* may be assigned to virtual machine 32*a*, storage resource 42*b* may be assigned to virtual machine 32*b*, and so on).

Some iSCSI implementations also allow offload, whereby a virtual machine instantiated on a particular information handling system is "migrated" to another information handling system. Offload may be desirable for many reasons, for example to allow a virtual machine to be moved from a first information handling system to a second information handling system in order to free up processing resources for other virtual machines instantiated on the first information handling system.

However, traditional virtualization architectures often do not allow seamless live migration of virtual machines between information handling systems that utilize different iSCSI implementations (e.g., migration from a "software initiator" implementation wherein initiators are present virtual machine clients to an implementation using iSCSI offload host bus adapter is not supported under traditional approaches).

SUMMARY

In accordance with the teachings of the present disclosure, the disadvantages and problems associated with offload in a virtualized information handling system have been substantially reduced or eliminated.

In accordance with one embodiment of the present disclosure, a method for increasing system availability in a virtualized information handling system including a hypervisor allowing multiple virtual machines to run on the virtualized information handling system may be provided. The method may include the hypervisor instantiating a virtual machine including an initiator client. The method may also include the hypervisor determining whether the virtualized information handling system is interfaced to an associated storage resource via an offload host bus adapter. If the virtualized information handling system is interfaced to the associated storage resource via an offload host bus adapter, the hypervisor may execute an adapter driver for the host bus adapter, the adapter driver for communicating input/output communications between the virtual machine and the associated storage resource via the offload host bus adapter. If the virtualized information handling system is interfaced to the associated storage resource via another adapter other than an offload host bus adapter, the hypervisor may execute an emulator, the emulator for emulating the functionality of the adapter driver for the host bus adapter and for communicating input/output communications between the virtual machine and the associated storage resource via the other adapter.

In accordance with yet another embodiment of the present disclosure, an article of manufacture may include a computer readable medium and computer-executable instructions carried on the computer readable medium. The instructions may be executable by one or more processors to (a) instantiate a virtual machine on a virtualized information handling system, the virtual machine including an initiator client, (b) determine whether the information handling system is interfaced to an associated storage resource via an offload host bus adapter, (c) if the virtualized information handling system is interfaced to the associated storage resource via an offload host bus adapter, execute an adapter driver for the host bus adapter, the adapter driver for communicating input/output communications between the virtual machine and the associated storage resource via the offload host bus adapter, and (d) if the virtualized information handling system is interfaced to the associated storage resource via another adapter other than an offload host bus adapter, execute an emulator, the emulator for emulating the functionality of the adapter driver for the host bus adapter and for communicating an input/output communications between the virtual machine and the associated storage resource via the other adapter.

In accordance with yet another embodiment of the present disclosure, an information handling system may include one or more processors, a memory communicatively coupled to the one or more processors, and computer-executable instructions carried on a computer readable medium. The instructions may be executable by one or more processors to (a) instantiate a virtual machine on a virtualized information handling system, the virtual machine including an initiator client, (b) determine whether the information handling system is interfaced to an associated storage resource via an offload host bus adapter, (c) if the virtualized information handling system is interfaced to the associated storage resource via an offload host bus adapter, execute an adapter driver for the host bus adapter, the adapter driver for communicating input/output communications between the virtual machine and the associated storage resource via the offload host bus adapter, and (d) if the virtualized information handling system is interfaced to the associated storage resource via another adapter other than an offload host bus adapter, execute an emulator, the emulator for emulating the functionality of the adapter driver for the host bus adapter and for communicating an input/output communications between the virtual machine and the associated storage resource via the other adapter.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 2:
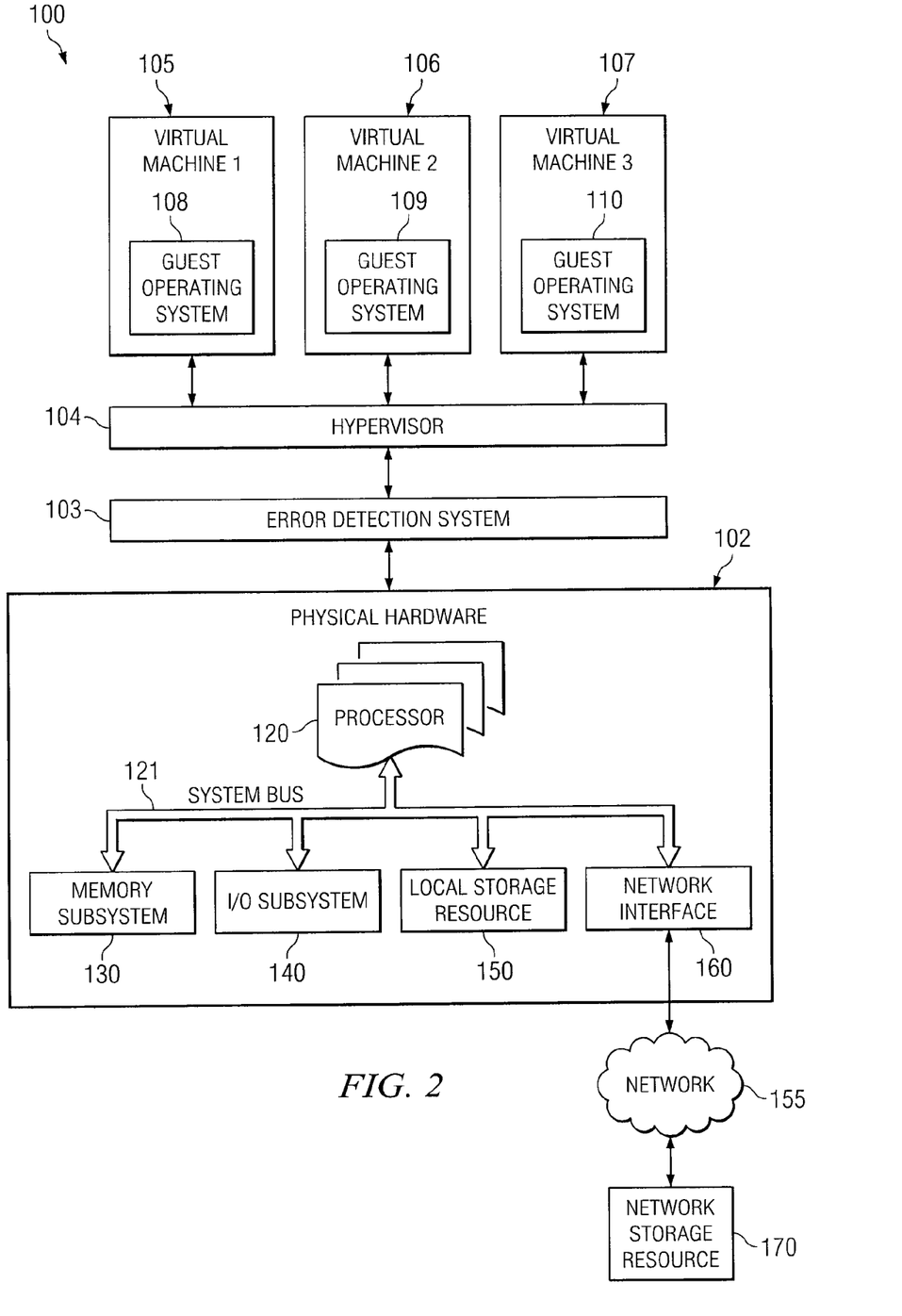
FIG. 2 illustrates a block diagram of an example system for increasing system availability in a virtualized information handling system, in accordance with certain embodiment of the present disclosure.
Figure 3:
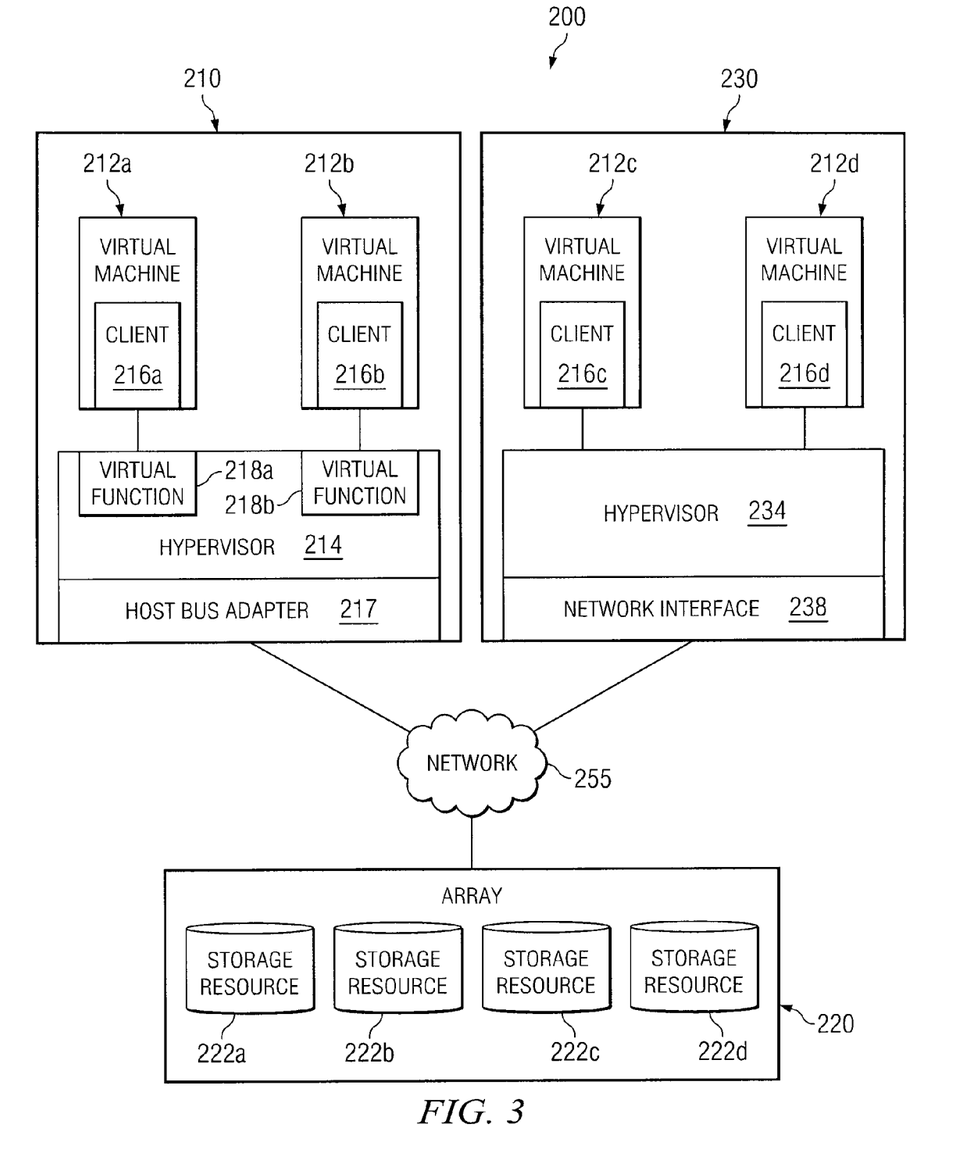
FIG. 3 illustrates a block diagram of a system for providing migration between different iSCSI implementations in a virtualized environment, in accordance with certain embodiments of the present disclosure.
Figure 4:
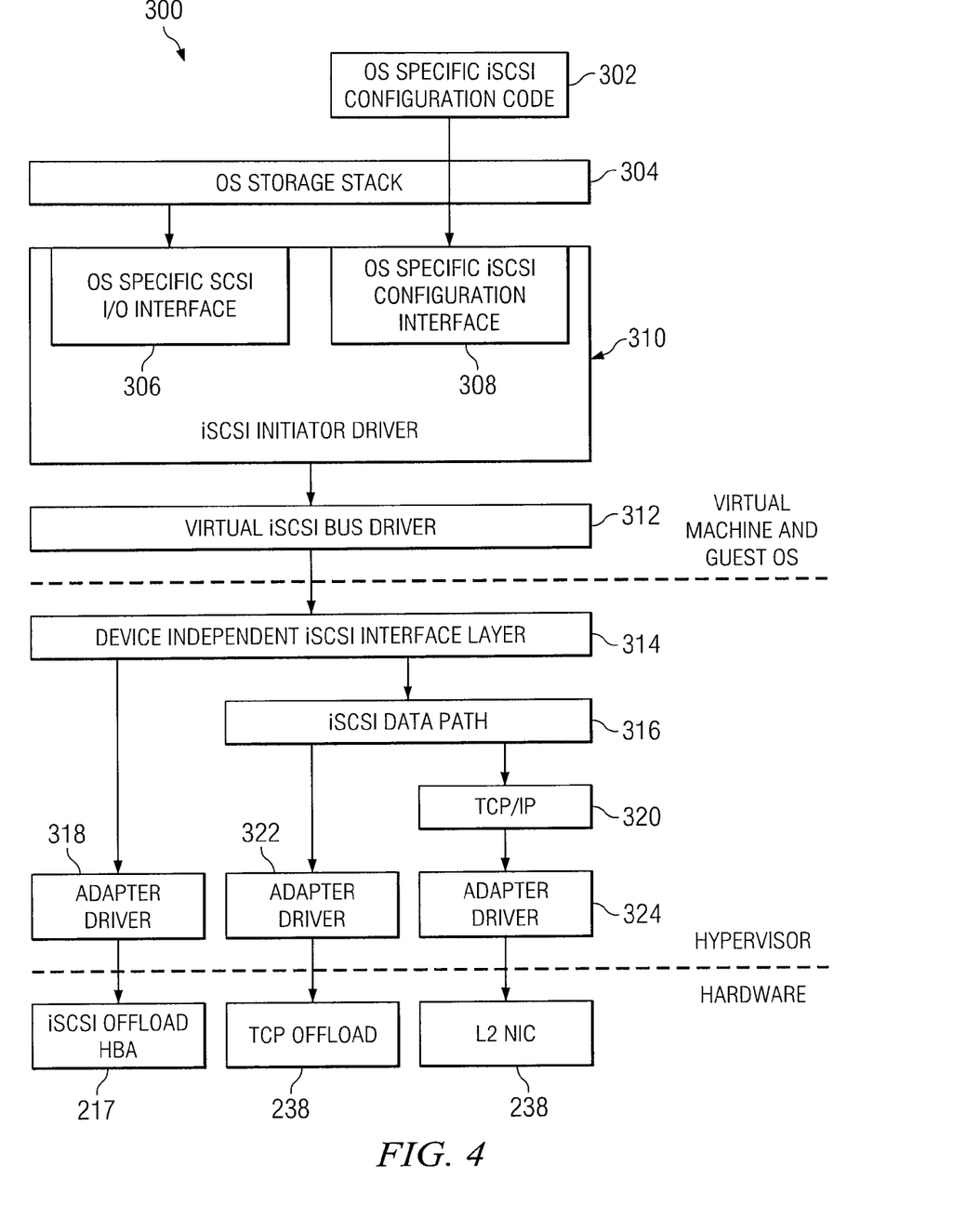
FIG. 4 illustrates an example protocol stack for implementing iSCSI-independent migration in a virtualized environment, in accordance with certain embodiments of the present disclosure.

Preferred embodiments and their advantages are best understood by reference to FIGS. 2-4 wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor and/or the error detection system, both described more fully below, may comprise firmware. As used in this disclosure, firmware includes any software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 2 illustrates a block diagram of an example system 100 for increasing system availability in a virtualized information handling system, in accordance with certain embodiments of the present disclosure. As depicted in FIG. 2, system 100 may comprise physical hardware 102, an error detection system 103, a hypervisor 104, and one or more virtual machines 105-107.

Components of physical hardware 102 may include, but are not limited to, one or more processors 120 and a system bus 121 that communicatively couples various system components to processors 120 including, for example, a memory subsystem 130, an I/O subsystem 140, local storage resource 150, and a network interface 160. The system bus 121 may be any suitable type of bus structure, e.g., a memory bus, a peripheral bus, or a local bus using any of a variety of bus architectures. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Network interface 160 may be any suitable system, apparatus, or device operable to serve as an interface between information handling system 100 and a network 155. Network interface 160 may enable information handling system 100 to communicate over network 155 using any suitable transmission protocol and/or standard, including without limitation all transmission protocols and/or standards enumerated below with respect to the discussion of network 155.

In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 155 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

Processors 120 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processors 120 may interpret and/or execute program instructions and/or process data stored locally (e.g., in memory subsystem 130 and/or another component of physical hardware 102). In the same or alternative embodiments, processors 120 may interpret and/or execute program instructions and/or process data stored remotely (e.g., in network storage resource 170).

Memory subsystem 130 may comprise any system, device, or apparatus operable to retain program instructions or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 100 is turned off.

Local storage resource 150 may comprise computer-readable media (e.g., hard disk drive, floppy disk drive, CD-ROM, and/or other type of rotating storage media, flash memory, EEPROM, and/or other type of solid state storage media) and may be generally operable to store data.

Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store data.

I/O subsystem 140 may comprise any system, device, or apparatus generally operable to receive and/or transmit data to/from/within information handling system 100. I/O subsystem 140 may comprise, for example, any number of communication interfaces, graphics interfaces, video interfaces, user input interfaces, and/or peripheral interfaces.

Error detection system 103 may comprise any system, device, or apparatus generally operable to detect errors that occur within physical hardware 102 of information handling system 100, and report those errors to hypervisor 104. In reporting such errors, error detection system 103 may include in the error report various information including, for example, the hardware resource from which the error originated, the type of error, the physical memory address at which the error occurred, and/or any other information that may be associated with the error. Although depicted as external to physical hardware 102, error detection system 103 and its various components may be implemented as hardware within physical hardware 102, firmware running on physical hardware 102 (including, e.g., as a component of hypervisor 104), software running on physical hardware 102 (including, e.g., as a component of hypervisor 104), or any combination thereof.

Hypervisor 104 may comprise software and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including without limitation, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, hypervisor 104 may comprise a specially designed operating system (OS) with native virtualization capabilities. In another embodiment, hypervisor 104 may comprise a standard OS with an incorporated virtualization component for performing virtualization.

In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, or as firmware running on physical hardware 102). As a further alternative, the virtualization application of hypervisor 104 may, on all levels, interact directly with physical hardware 102 (e.g., similar to the way the OS interacts directly with physical hardware 102, or as firmware running on physical hardware 102) without utilizing the OS, although still interacting with the OS to coordinate use of physical hardware 102.

To allow multiple operating systems to run on information handling system 100 at the same time, hypervisor 104 virtualizes the hardware resources of physical hardware 102 and presents virtualized computer hardware representations to each of virtual machines 105-107. In other words, hypervisor 104 may assign to each of virtual machines 105-107, for example, one or more processors 120, one or more regions of memory in memory subsystem 130, one or more components of I/O subsystem 140, etc. The virtualized hardware representation presented to each of virtual machines 105-107 may comprise a mutually exclusive, or non-overlapping, set of hardware resources per virtual machine (e.g., no hardware resources are shared between virtual machines) or may comprise an overlapping set of hardware resources per virtual machine (e.g., one or more hardware resources may be shared by two or more virtual machines).

In one embodiment, hypervisor 104 may assign hardware resources of physical hardware 102 statically (i.e., certain hardware resources are assigned to certain virtual machines, and this assignment does not vary over time). Additionally or alternatively, hypervisor 104 may assign hardware resources of physical hardware 102 dynamically (i.e., the assignment of hardware resources to virtual machines varies over time, for example, in accordance with the specific needs of the applications running on the individual virtual machines). Additionally or alternatively, hypervisor 104 may keep track of the hardware-resource-to-virtual-machine mapping, such that hypervisor 104 is able to determine the virtual machines to which any given hardware resource of physical hardware 102 has been assigned.

Each of virtual machines 105-107 may include a guest operating system (guest OS) 108-110, along with any applications or other software running on guest OS 108-110. Each guest OS 108-110 may be any OS compatible with and/or supported by hypervisor 104 (even if guest OS is generally incompatible with physical hardware 102). In addition, each guest OS 108-110 may be a separate instance of the same operating system or an instance of three different operating systems. For example, in one embodiment, each guest OS 108-110 may comprise a LINUX OS. As another example, guest OS 108 may comprise a LINUX OS, guest OS 109 may comprise a MICROSOFT WINDOWS OS, and guest OS 110 may comprise a VXWORKS OS. Although information handling system 100 is depicted as having three virtual machines 105-107, any number of virtual machines may be running on information handling system 100 at any given time.

In operation, hypervisor 104 of information handling system 100 may virtualize the hardware resources of physical hardware 102 and present virtualized computer hardware representations to each of virtual machines 105-107. Each guest OS 108-110 of virtual machines 105-107 may then begin to operate and run applications and/or other software. While operating, each guest OS 108-110 may utilize one or more hardware resources of physical hardware 102 assigned to the respective virtual machine by hypervisor 104.

If an uncorrectable/unrecoverable hardware error occurs in physical hardware 102, error detection system 103 may detect the error and report the error to hypervisor 104. In reporting such errors, error detection system 103 may include in the error report various information including, for example, the hardware resource from which the error originated, the type of error, the physical memory address at which the error occurred, or any other information that may be associated with the error.

In one embodiment, error detection system 103 may report the error to hypervisor 104 directly, for example, by invoking a callback routine in hypervisor 104, by triggering an interrupt handler in hypervisor 104, or by triggering an exception handler in hypervisor 104. In the same or alternative embodiments, error detection system 103 may report the error to hypervisor 104 indirectly by writing to volatile or non-volatile storage an error log that may be subsequently (e.g., through polling) processed by hypervisor 104. In the same or alternative embodiments, error detection system 103 may report the error to hypervisor 104 using the Microsoft Windows Hardware Error Architecture (WHEA).

Because hypervisor 104 keeps track of the hardware-resource-to-virtual-machine mapping, hypervisor 104 may determine whether the hardware resource associated with the error is assigned to any of virtual machines 105-107. If hypervisor 104 determines that the hardware resource associated with the error is, in fact, assigned to any of virtual machines 105-107, hypervisor 104 may shut down any such virtual machines. At the same time, hypervisor 104 may not shut down any of virtual machines 105-107 to which the hardware resource associated with the error is not assigned. Thus, virtual machines in this latter category may continue to run, and may not be affected by the hardware error.

FIG. 3 illustrates a block diagram of a system 200 for providing migration between different iSCSI implementations in a virtualized environment in accordance with certain embodiments of the present disclosure. As depicted in FIG. 3, system 200 may include information handling systems 210 and 230, network 255, and storage array 220.

Information handling system 210 may have executing thereon one or more virtual machines 212 instantiated thereon and a hypervisor 214. Information handling system 210 may also include an iSCSI offload host bus adapter 217 configured to couple information handling system 210 to storage array 220 via network 255. Each virtual machine 212 of information handling system 210 may include a client 216 that may serve as an initiator of iSCSI commands. In addition, each hypervisor 214 may include a virtual function 218 associated with each virtual machine 212 executing on information handling system 210, described in greater detail below.

Information handling system 230 may have executing thereon one or more virtual machines 212 instantiated thereon and a hypervisor 234. Information handling system 230 network interface 238 configured to couple information handling system 230 to storage array 220 via network 255. Network interface 238 may include a TCP offload engine, L2 network interface card, or any other suitable components. Similar to information handling system 210, each virtual machine 212 of information handling system 230 may include a client 216 that may serve as an initiator of iSCSI commands.

Accordingly, in operation, each virtual machine 212 "sees" a client 216 that may serve as an iSCSI initiator, independent of the underlying iSCSI implementation for the particular virtual machine 212. Thus, storage resources 222 may be allocated to individual virtual machines 212 (e.g., storage resource 222a may be allocated to virtual machine 212a, storage resource 222b may be allocated to virtual machine 212b, storage resource 222c may be allocated to virtual machine 212c, and so on.

FIG. 4 illustrates an example protocol stack 300 running on each information handling system 210, 230 for implementing iSCSI-independent migration in a virtualized environment, in accordance with certain embodiments of the present disclosure. As depicted in FIG. 4, each virtual machine 212 may have its own operating system-specific iSCSI configuration code 302 that interfaces with a respective operating specific iSCSI configuration interface 308. In addition, each virtual machine 212 may have its own operating system-specific iSCSI input/output (I/O) commands 304 and operating system-specific SCSI I/O interface 306.

Each virtual machine 212 may also include an iSCSI initiator driver 310 that may serve as an initiator of iSCSI commands. As depicted, iSCSI initiator driver 310 provides an interface between the operating system specific iSCSI architecture and the virtual iSCSI bus driver 312. Because a hypervisor 214, 234 may appear to each operating system as a virtual iSCSI bus, each virtual machine 212 may include a virtual iSCSI bus driver 312 that provides a driver layer interfacing between the hypervisor 214, 234 and the iSCSI initiator driver 310. The virtual iSCSI bus driver 312 may communicate iSCSI parameters (e.g., initiator and/or other identifiers, connection parameters, authentication/security information) and SCSI command information (e.g., commands and/or data) between the virtual machine 212 and its associated hypervisor 214, 234.

At the hypervisor level, each hypervisor 214, 234 may include an implementation-independent iSCSI interface layer 314. The implementation-independent iSCSI interface layer 314 provides a common application programming interface to each virtual machine 212 which is independent of the specific iSCSI implementation (e.g., independent of whether the iSCSI implementation is an iSCSI offload host bus adapter, a TCP offload engine, an L2 network interface card, or otherwise). As depicted in FIG. 4, implementation-independent iSCSI interface layer 314 may interface with adapter driver 318, which may serve as a hardware interface for iSCSI host bus adapter 217. Similarly, iSCSI data path module 316 may be a software module that provides functionality equivalent or similar to adapter driver 318 for software initiator implementations of iSCSI (e.g., TCP offload and/or L2 network interface card 238). The iSCSI data path module 316 may also interface with TCP/IP modules 320 and/or adapter drivers 322 and 324 associated with software initiator implementations.

Turning again to FIG. 3, in certain embodiments (e.g., where host bus adapter 217 supports single root-I/O virtualization or "SR-IOV"), hypervisor 214 may assign a virtual function 218 (e.g., a SR-IOV virtual function) to each virtual machine 212 instantiated on information handling system 210. Accordingly, all iSCSI identification information (e.g., name, parameters, authentication/security) may be configured for the virtual function 218 based on information communicated from the client 216. Thus, when a virtual machine 212 is migrated from a iSCSI offload-based information handling system (e.g., information handling system 210) to a software initiator-based information handling system (e.g., information handling system 230), the hypervisor 214 may use its iSCSI data path component 316 to emulate the functionality of the host bust adapter 217, permitting seamless migration. Such emulation may allow for seamless migration of the virtual machine 212 between information handling systems having different iSCSI implementations.

Using the methods and systems disclosed herein, problems associated with conventional approaches to offload in a virtualized information handling system may be improved, reduced, or eliminated.

Although the present disclosure has been described in detail, it should be understood that various changes, substitutions, and alterations can be made hereto without departing from the spirit and the scope of the disclosure as defined by the appended claims.

What is claimed is:

1. A method for increasing system availability in a virtualized information handling system including a hypervisor allowing multiple virtual machines to run on the virtualized information handling system, comprising:
   the hypervisor instantiating a virtual machine including an initiator client, the virtual machine being migrated from a previous information handling system (IHS);
   the hypervisor determining whether the virtualized information handling system was previously interfaced to an associated storage resource via an offload host bus adapter on the previous IHS;
   the hypervisor determining whether the virtualized information handling system was previously interfaced to an associated storage resource via another adapter other than an offload host bus adapter on the previous IHS;
   if the virtualized information handling system was previously interfaced to the associated storage resource via an offload host bus adapter, the hypervisor executing an adapter driver for the host bus adapter, the adapter driver for communicating input/output communications between the virtual machine and the associated storage resource via the offload host bus adapter; and
   if the virtualized information handling system was previously interfaced to the associated storage resource via another adapter other than an offload host bus adapter, the hypervisor executing an emulator, the emulator for emulating the functionality of the adapter driver for the host bus adapter and for communicating input/output communications between the virtual machine and the associated storage resource via the other adapter.

2. A method according to claim 1, the initiator client comprising an iSCSI initiator.

3. A method according to claim 1, wherein the other adapter includes a TCP offload engine.

4. A method according to claim 1, wherein the other adapter includes an L2 network interface card.

5. An article of manufacture comprising:
   a non-transitory computer readable medium; and computer-executable instructions carried on the non-transitory computer readable medium, the instructions executable by one or more processors, to:

> instantiate a virtual machine on a virtualized information handling system, the virtual machine including an initiator client, the virtual machine being migrated from a previous information handling system (IHS);
>
> determine whether the information handling system was previously interfaced to an associated storage resource via an offload host bus adapter on the previous IHS;
>
> determine whether the information handling system was previously interfaced to an associated storage resource via another adapter other than an offload host bus adapter on the previous IHS;
>
> if the virtualized information handling system was previously interfaced to the associated storage resource via an offload host bus adapter, execute an adapter driver for the host bus adapter, the adapter driver for communicating input/output communications between the virtual machine and the associated storage resource via the offload host bus adapter; and
>
> if the virtualized information handling system was previously interfaced to the associated storage resource via another adapter other than an offload host bus adapter, execute an emulator, the emulator for emulating the functionality of the adapter driver for the host bus adapter and for communicating an input/output communications between the virtual machine and the associated storage resource via the other adapter.

6. An article of manufacture according to claim 5, the initiator client comprising an iSCSI initiator.

7. An article of manufacture according to claim 5, wherein the other adapter includes a TCP offload engine.

8. An article of manufacture according to claim 5, wherein the other adapter includes an L2 network interface card.

9. An information handling system comprising:

> one or more processors;
> a memory communicatively coupled to the one or more processors; and
> computer-executable instructions carried on a non-transitory computer readable medium, the instructions executable by the one or more processors to:
>
>> instantiate a virtual machine on the information handling system, the virtual machine including an initiator client, the virtual machine being migrated from a previous information handling system (IHS);
>>
>> determine whether the information handling system was previously interfaced to an associated storage resource via an offload host bus on the previous IHS;
>>
>> determine whether the information handling system was previously interfaced to an associated storage resource via another adapter other than an offload host bus adapter on the previous IHS;
>>
>> if the information handling system was previously interfaced to the associated storage resource via an offload host bus adapter, execute an adapter driver for the host bus adapter, the adapter driver for communicating input/output communications between the virtual machine and the associated storage resource via the offload host bus adapter; and
>>
>> if the information handling system was previously interfaced to the associated storage resource via another adapter other than an offload host bus adapter, execute an emulator, the emulator for emulating the functionality of the adapter driver for the host bus adapter and for communicating input/output communications between the virtual machine and the associated storage resource via the other adapter.

10. An information handling system according to claim 9, the initiator client comprising an iSCSI initiator.

11. An information handling system according to claim 9, wherein the other adapter includes a TCP offload engine.

12. An information handling system according to claim 9, wherein the other adapter includes an L2 network interface card.

* * * * *